(12) United States Patent
Stark (10) Patent No.: US 10,744,576 B2
(45) Date of Patent: Aug. 18, 2020

(54) CUTTING INSERT FOR A MILLING TOOL AND MILLING TOOL

(71) Applicant: Hartmetall-Werkzeugfabrik Paul Horn GmbH, Tübingen (DE)

(72) Inventor: Christian Stark, Rottenburg (DE)

(73) Assignee: Hartmetall-Werkzeugfabrik Paul Horn GmbH, Tubingen (DE)

( * ) Notice: Subject to any disclaimer, the term of this patent is extended or adjusted under 35 U.S.C. 154(b) by 0 days.

(21) Appl. No.: 16/196,054

(22) Filed: Nov. 20, 2018

(65) Prior Publication Data

US 2019/0084059 A1    Mar. 21, 2019

Related U.S. Application Data

(63) Continuation of application No. PCT/EP2017/052310, filed on Feb. 3, 2017.

(30) Foreign Application Priority Data

May 23, 2016 (DE) .......................... 10 2016 109 452

(51) Int. Cl.
  *B23C 5/20* (2006.01)
  *B23C 5/06* (2006.01)
  *B23C 5/10* (2006.01)

(52) U.S. Cl.
  CPC .............. *B23C 5/109* (2013.01); *B23C 5/207* (2013.01); *B23C 2200/0411* (2013.01);
  (Continued)

(58) Field of Classification Search
  CPC ....... B23C 2200/0411; B23C 2200/201; B23C 2200/203; B23C 2200/286; B23C 5/109;
  (Continued)

(56) References Cited

U.S. PATENT DOCUMENTS 3,289,271 A * 12/1966 Stier ...................... B23B 27/141
                                                           407/113
4,475,851 A * 10/1984 Hale ...................... B23B 27/141
                                                           407/113
(Continued)

FOREIGN PATENT DOCUMENTS

CN       103492109 A      1/2014
CN       104364039 A      2/2015
(Continued)

OTHER PUBLICATIONS

International Search Report for International Application No. PCT/EP2017/052310 dated Jun. 21, 2017.
(Continued)

*Primary Examiner* — Sara Addisu
(74) *Attorney, Agent, or Firm* — Jason H. Vick; Sheridan Ross, PC (57) ABSTRACT

A cutting insert for a milling tool, having a first side, a second side which is identical to the first side and a circumferential surface which extends between the first and the second sides, with a bore which extends along a bore axis. The cutting insert is 120° rotationally symmetrical with respect to the bore axis and includes on each of the first side and the second side three identically formed cutting regions, respectively, which are situated at a transition between the first side and the circumferential surface or at a transition between the second side and the circumferential surface, respectively. Each of the in total six cutting regions includes a first rectilinear cutting edge, a second rectilinear cutting edge, and a third arcuate cutting edge, wherein a first end of the first cutting edge is connected to a first end of the third cutting edge, and a first end of the second cutting edge is connected to a second end of the third cutting edge, wherein the first and the second cutting edges are of same length. The cutting insert includes on the first side a first contact surface
(Continued)

which extends orthogonally to the bore axis and lies in a first contact plane, and on the second side includes a second contact surface which extends orthogonally to the bore axis and lies in a second contact plane, and wherein each of the first cutting edges are connected at their second ends, which are located opposite the first ends, to one of a total of six arcuate edges, a vertex of which is located between the first and the second contact planes.

12 Claims, 6 Drawing Sheets

(52) U.S. Cl.
CPC .. *B23C 2200/201* (2013.01); *B23C 2200/203* (2013.01); *B23C 2200/286* (2013.01)

(58) Field of Classification Search
CPC ........... B23C 5/207; B23C 5/06; B23C 5/202; B23C 2200/0444; B23C 2200/205; B23C 2200/164

See application file for complete search history.

(56) References Cited

U.S. PATENT DOCUMENTS

| | | | |
|---|---|---|---|
| 8,096,735 B2 | 1/2012 | Sladek et al. | |
| 8,177,460 B2 | 5/2012 | Satran et al. | |
| 8,430,606 B2 | 4/2013 | Zettler | |
| 8,506,212 B2 | 8/2013 | Meyer et al. | |
| 8,573,905 B2 | 11/2013 | Hecht | |
| 9,050,667 B2 * | 6/2015 | Park | B23C 5/06 |
| 9,533,356 B2 * | 1/2017 | Koga | B23C 5/06 |
| 9,770,767 B2 * | 9/2017 | Shibata | B23C 5/06 |
| 10,022,803 B2 * | 7/2018 | Yamaguchi | B23C 5/20 |
| 10,058,937 B2 | 8/2018 | Koga et al. | |
| 2007/0071559 A1 | 3/2007 | Koskinen | |
| 2013/0022418 A1 * | 1/2013 | Fukano | B23C 5/202 407/113 |
| 2013/0251464 A1 | 9/2013 | Hecht | |
| 2019/0084059 A1 * | 3/2019 | Stark | B23C 5/109 |

FOREIGN PATENT DOCUMENTS

| | | | | |
|---|---|---|---|---|
| EP | 1736266 | A1 | 12/2006 | |
| EP | 2703108 | A1 | 3/2014 | |
| EP | 2727672 | A1 | 5/2014 | |
| EP | 2774705 | A1 | 9/2014 | |
| EP | 2893995 | A1 | 7/2015 | |
| JP | 2013-500169 | A | 1/2013 | |
| JP | 5639710 | B2 | 12/2014 | |
| RU | 2422253 | C2 | 6/2011 | |
| RU | 2454302 | C2 | 6/2012 | |
| RU | 2463131 | C1 | 10/2012 | |
| RU | 2583975 | C1 | 5/2016 | |
| SU | 512009 | A1 | 4/1976 | |
| WO | WO 2012/147924 | | 11/2012 | |
| WO | WO-2012147924 | A1 * | 11/2012 | B23C 5/06 |
| WO | WO 2015/104703 | | 7/2015 | |
| WO | WO 2015/156373 | | 10/2015 | |

OTHER PUBLICATIONS

Written Opinion for International Application No. PCT/EP2017/052310 dated Jun. 21, 2017.
International Preliminary Report on Patentability for International Application No. PCT/EP2017/052310 dated Dec. 6, 2018.
Office Action (Including Translation) for corresponding Russian Application No. 2018140886/02(067947), dated Sep. 27, 2019.
Office Action for corresponding Chinese Application No. 201780031196.2, dated Nov. 26, 2019.
Notification of Reasons for Rejection (Including Translation) for corresponding Japanese Patent Application No. 2018-561683, dated Dec. 10, 2019.

* cited by examiner

CUTTING INSERT FOR A MILLING TOOL AND MILLING TOOL

CROSS REFERENCE TO RELATED APPLICATIONS

This application is a continuation of international patent application PCT/EP2017/052310, filed on Feb. 3, 2017 designating the U.S., which international patent application has been published in German language and claims priority from German patent application DE 10 2016 109 452.8, filed on May 23, 2016. The entire contents of these priority applications are incorporated herein by reference.

BACKGROUND OF THE INVENTION

This disclosure relates to a cutting insert for a milling tool. This disclosure furthermore relates to a milling tool having such a cutting insert, a tool holder and a fastening element for fastening the cutting insert to the tool holder.

The cutting insert according to the disclosure is a double-sided indexable cutting insert which is used, in particular, in milling tools. It has a first side, a second side which is identical to the first side and a circumferential surface which extends between the first and the second side. In addition, the cutting insert comprises a bore which extends along a bore axis, wherein the cutting insert is 120° rotationally symmetrical with respect to the bore axis. The cutting insert comprises on each of the first side and the second side three identically formed cutting regions, respectively, which are situated at a transition between the first side and the circumferential surface or at a transition between the second side and the circumferential surface, respectively. On account of the double-sided realization of the cutting insert (identical first side and second side), a total of six cutting regions are produced. Each of said six cutting regions comprises a rectilinear first cutting edge, a rectilinear second cutting edge and an arcuate third cutting edge, wherein a first end of the first cutting edge is connected directly to a first end of the third cutting edge, and a first end of the second cutting edge is connected directly to a second end of the third cutting edge. Each of the arcuate third cutting edges are arranged between a first and a second rectilinear cutting edge. The first and the second cutting edges are of same length. The cutting insert additionally comprises on the first side a first contact surface which extends orthogonally to the bore axis and lies in a first contact plane. On the second side, the cutting insert also comprises a second contact surface which extends orthogonally to the bore axis and lies in a second contact plane, which extends parallel to the first contact plane.

Exemplary cutting inserts are disclosed in WO 2015/104703 A1, EP 2 727 672 A1, and EP 2 774 705 A1.

Although the cutting inserts already disclosed in the state of the art have proven to be advantageous in many kinds of aspects, they do nevertheless have some disadvantages, in particular with reference to the cutting properties.

SUMMARY OF THE INVENTION

It is an object to provide a cutting insert of the above-mentioned type which is advantageous compared to cutting inserts disclosed in the prior art, in particular with reference to the cutting properties.

According to a first aspect, a cutting insert for a milling tool is presented, having a first side, a second side which is identical to the first side, a circumferential surface which extends between the first and the second sides, and a bore which extends along a bore axis, wherein the cutting insert is 120° rotationally symmetrical with respect to the bore axis and comprises six identical cutting regions,
wherein three of said six cutting regions are arranged at a transition between the first side and the circumferential surface, and wherein another three of said six cutting regions are arranged at a transition between the second side and the circumferential surface,
wherein each of the six cutting regions comprises a first rectilinear cutting edge, a second rectilinear cutting edge, and a third arcuate cutting edge, wherein in each of the six cutting regions a first end of the first cutting edge is connected to a first end of the third cutting edge, and a first end of the second cutting edge is connected to a second end of the third cutting edge, and wherein the first and the second cutting edges are of same length,
wherein the cutting insert further comprises on the first side a first contact surface which extends orthogonally to the bore axis and lies in a first contact plane, and on the second side comprises a second contact surface which extends orthogonally to the bore axis and lies in a second contact plane,
wherein each of the first cutting edges has a second end located opposite the first end of the respective first cutting edge, wherein each of the second ends of the first cutting edges is connected to one of six arcuate edges, and
wherein each of said six arcuate edges has a vertex which is located between the first and the second contact planes.

According to a second aspect, a milling tool is presented which comprises a cutting insert of the aforementioned type, a tool holder, and a fastening element for fastening the cutting insert to the tool holder.

On account of the fact that each of the vertices of the arcuate edges are arranged between the first and the second contact plane, the vertices, when viewed in a side view of the cutting insert, are each arranged "below" the first or second contact surface. Advantageous properties for the design of the chip shape geometry are produced as a result of the position of the vertices below the contact plane; like, for example, a certain chip break, a targeted chip form and chip control during machining.

Each of the second ends of the first cutting edges are preferably connected directly to a first end of the arcuate edges, wherein each of the second cutting edges are connected with their second ends, which are located opposite the first ends, to a second end of the arcuate edges. Thus, each of the arcuate edges (radii) preferably extends between a first cutting edge of a cutting region and a second cutting edge of another cutting region of the same cutting insert side. Thus, the arcuate edges separate, as it were, the cutting regions from one another. Three arcuate edges, which are offset by 120° with respect to one another, exist in total per cutting insert side.

The arcuate edges are not to be confused with the arcuate third cutting edges. The arcuate third cutting edges form the tips of the cutting regions. They are each arranged between a first cutting edge and a second cutting edge of the respectively same cutting region, and are connected directly to the first ends thereof.

According to a further refinement, the first cutting edges enclose an acute angle α with the second cutting edges of the respective same cutting regions.

In contrast to this, the majority of cutting inserts of the prior art comprise a right angle at this point. The structural realization as an acute angle produces improved "plunging" as correspondingly large freewheeling properties of the milling tool are produced. The fine cutting of the milling tool during the angled or circular "plunging" is also better with an acute angle.

"Plunging" of the milling tool refers, in particular, to processing where the milling tool rotates and is moved into the workpiece at an angle to the rotational axis. The feed direction, in this case, has both a movement component parallel to the rotational axis of the milling tool and a movement component perpendicular thereto. With reference to the cutting properties, angles α within the range of between 84° and 86° have proved to be advantageous. An angle α of 85° is particularly preferred.

According to a further refinement, an imaginary circle, the center of which lies on the bore axis, is at a total of six points tangent to the first and second cutting edges arranged on the first side. However, said circle is tangent to each of said cutting edges only at one point each. Corresponding to this, a second imaginary circle, the center of which also lies on the bore axis, is at a total of six points tangent to the first and second cutting edges arranged on the second side.

According to a further refinement, the cutting insert, at least except for the bore, is mirror-symmetrical to a center plane which extends orthogonally to the bore axis and is equidistant to the first and the second contact planes.

The restriction of the mirror symmetry "except for the bore" is based, in particular, on the fact that the bore, which is preferably designed as a through bore, is preferably not designed to be precisely mirror symmetrical with reference to the center plane due to the manufacturing process. This results, in particular, from the press molds which are used to press the cutting insert. Said non-precise mirror symmetry of the bore relative to the center plane, however, has no influence on how the cutting insert is arranged on the holder. The insert seat and the cutting properties, independently of whether the cutting insert rests on the tool holder with its first or its second side, are in each case the same, as the cutting insert is otherwise precisely symmetrical and the slight asymmetry of the bore with reference to the center plane has no influence on the fastening of the cutting insert on the tool holder.

It is obvious that it is possible, in principle, for the bore also to be precisely mirror-symmetrical to the center plane.

According to a further refinement, each of the arcuate third cutting edges comprises a vertex, wherein each of the vertices of the third cutting edges are at a greatest distance to the center plane compared to all remaining points of the cutting insert.

Both the first and the second cutting edges extend with reference to the center plane, that is to say at an angle. The corners of the cutting regions in which the arcuate third cutting edges are arranged, form the respectively highest points (measured parallel to the bore axis) of the first or second side of the cutting insert.

According to a further refinement, the first contact surface comprises three first part surfaces which are separated from one another and lie in the first contact plane. The second contact surface also preferably comprises three part surfaces with are separated from one another and lie in the second contact plane. The three first part surfaces are preferably separated from one another by three first indentations which are arranged offset to one another by 120°. The three second part surfaces are also separated from one another by three second indentations which are offset to one another by 120°.

A mechanically defined three-point support, which provides a mechanically stable seat for the indexable cutting insert in the insert seat, is generated by said separation of the contact surfaces.

According to a refinement of the herein presented milling tool, the fastening element is designed as a screw and the tool holder comprises a thread which extends along a thread axis, in which thread engages the screw by way of which the cutting insert is fastened on the tool holder, wherein the tool holder comprises a first, a second and a third holder-contact surface. The first holder contact surface extends orthogonally to the thread axis. The second and the third holder contact surfaces extend transversely to one another and substantially parallel to the thread axis. The cutting insert, in a mounted state of the tool, abuts against the tool holder only at the first, the second and the third holder contact surfaces.

In contrast to the majority of milling tools of this type disclosed in the prior art, the cutting insert abuts against the tool holder therefore "only" at a total of three surfaces and not, as otherwise usual, at four surfaces.

The second and the third holder contact surfaces enclose an obtuse angle between one another, wherein the cutting insert abuts against the second holder contact surface with a first region of the circumferential surface and abuts against the third holder contact surface with a second region of the circumferential surface.

According to a further refinement of the herein presented milling tool, a distance between the thread axis and the second holder contact surface is as large as a distance between the thread axis and the third holder contact surface but smaller than a distance between the bore axis and the first or second regions of the circumferential surface. This results in a kind of pull-down action such that the screw automatically presses the cutting insert against the second and third holder contact surfaces during tightening. This increases the stability of the indexable cutting insert in the insert seat.

It is obvious that the features named above and the features yet to be explained below can be used not only in the respectively provided combinations but also in other combinations or standing alone without departing from the spirit and scope of the present disclosure.

DESCRIPTION OF PREFERRED EMBODIMENTS

Figure 8:
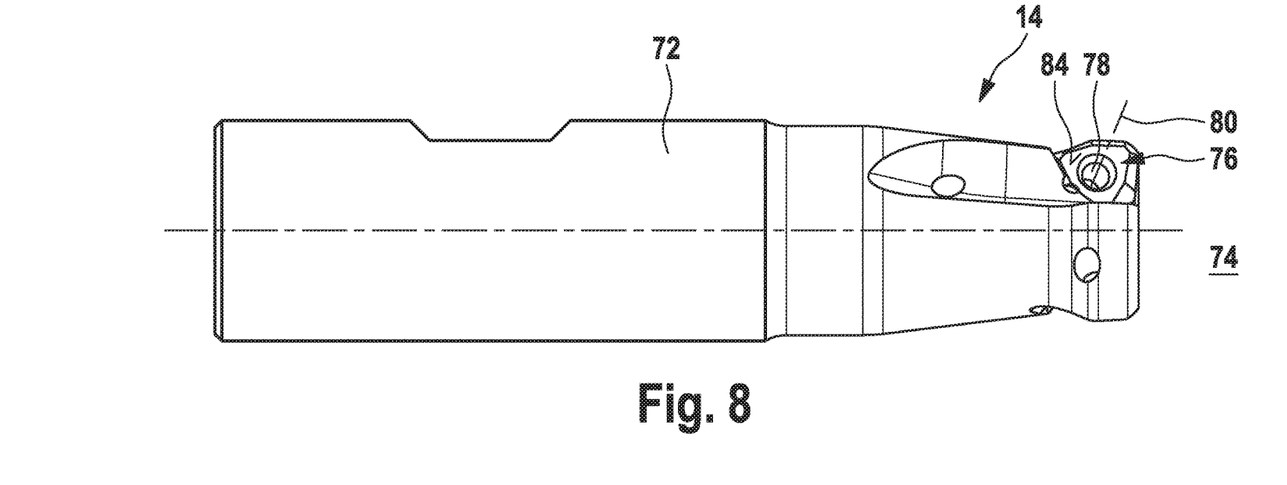
FIG. 8 shows a first view of a tool holder according to an exemplary embodiment.
Figure 9:
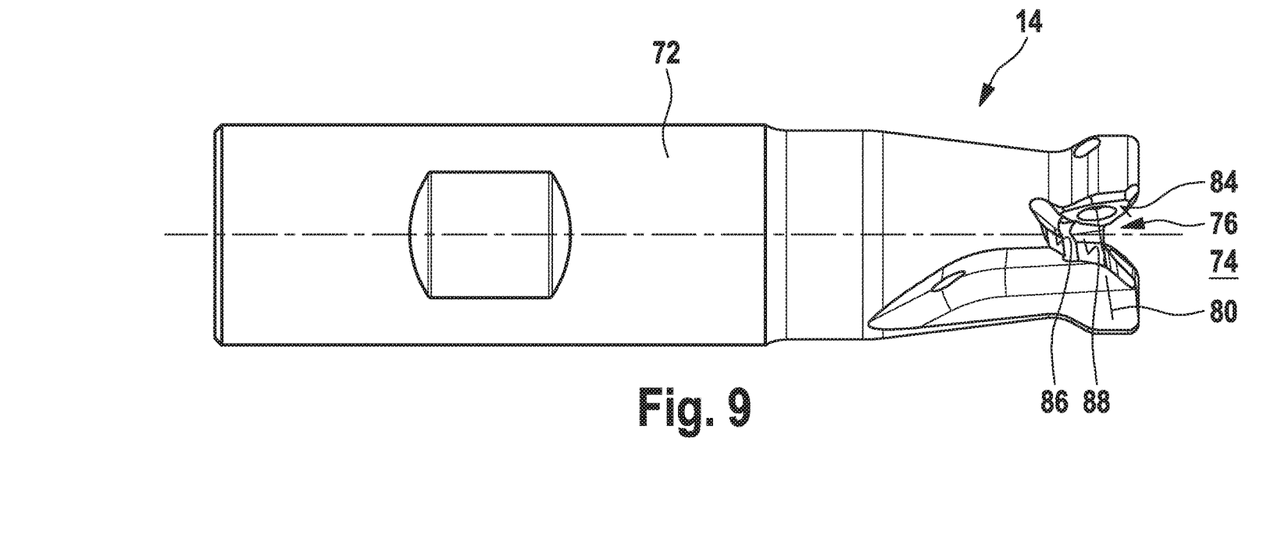
FIG. 9 shows a second view of the tool holder shown in FIG. 8.
Figure 10:
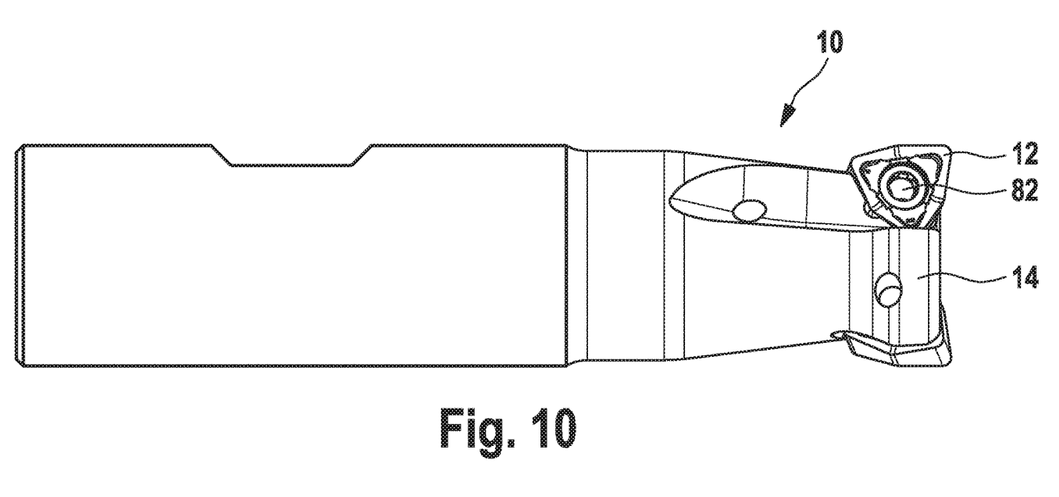
FIG. 10 shows a first view of an exemplary embodiment of the herein presented milling tool.
Figure 11:
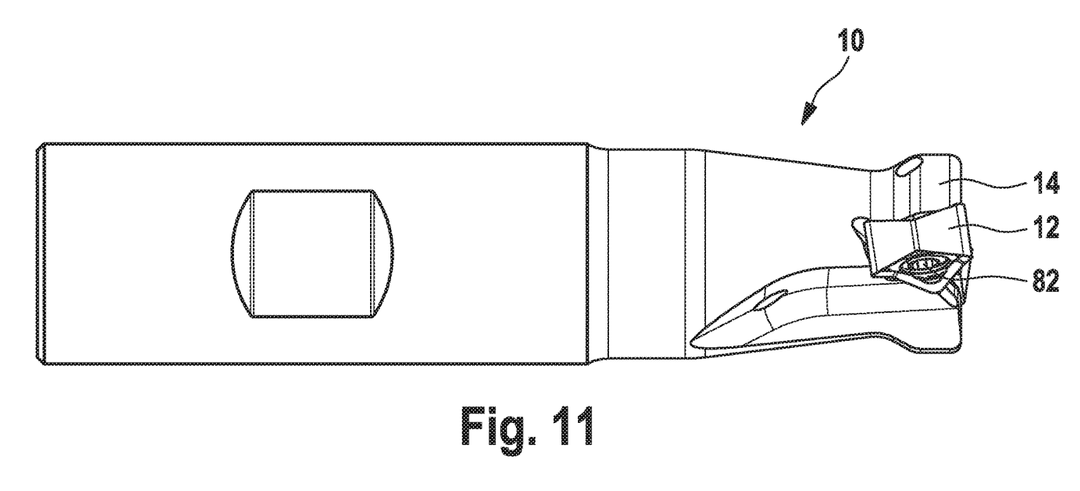
FIG. 11 shows a second view of the exemplary embodiment of the milling tool shown in FIG. 10.
Figure 12:
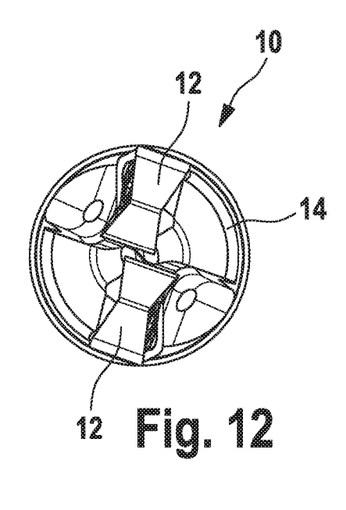
FIG. 12 shows a third view of the exemplary embodiment of the milling tool shown in FIG. 10.

FIGS. 1-7 show two different embodiments of the cutting insert. FIGS. 8 and 9 show an embodiment of a tool holder of the milling tool. FIGS. 10-12 show an embodiment of the milling tool including cutting insert and tool holder.

The milling tool is designated in its entirety by way of the reference numeral 10 in the figures. The cutting insert is designated in its entirety by way of the reference numeral 12 in the figures. The tool holder is designated in its entirety by way of the reference numeral 14 in the figures.

The cutting insert 12 is a double-sided indexable cutting insert. It has a top side 16 which is designated as a first side of the cutting insert 12 and a bottom side 18 which is designated in the present case as a second side of the cutting insert 12. The first side 16 of the cutting insert 12 is shown in top view in FIG. 2. The second side 18 is designed identically to said first side. The cutting insert 12 is designed to be mirror-symmetrical to a center plane 20 which divides the cutting insert 12 into two halves of the same size (see FIG. 4) at least except for minor details which are to be explained further below. Said center plane 20 extends orthogonally to a symmetry axis 22 (see FIG. 3). The symmetry axis 22 coincides with a center axis of a bore 24 which penetrates the cutting insert 12 completely. The symmetry axis or center axis 22 of the bore 24 is consequently designated below as bore axis 22.

Figure 1:
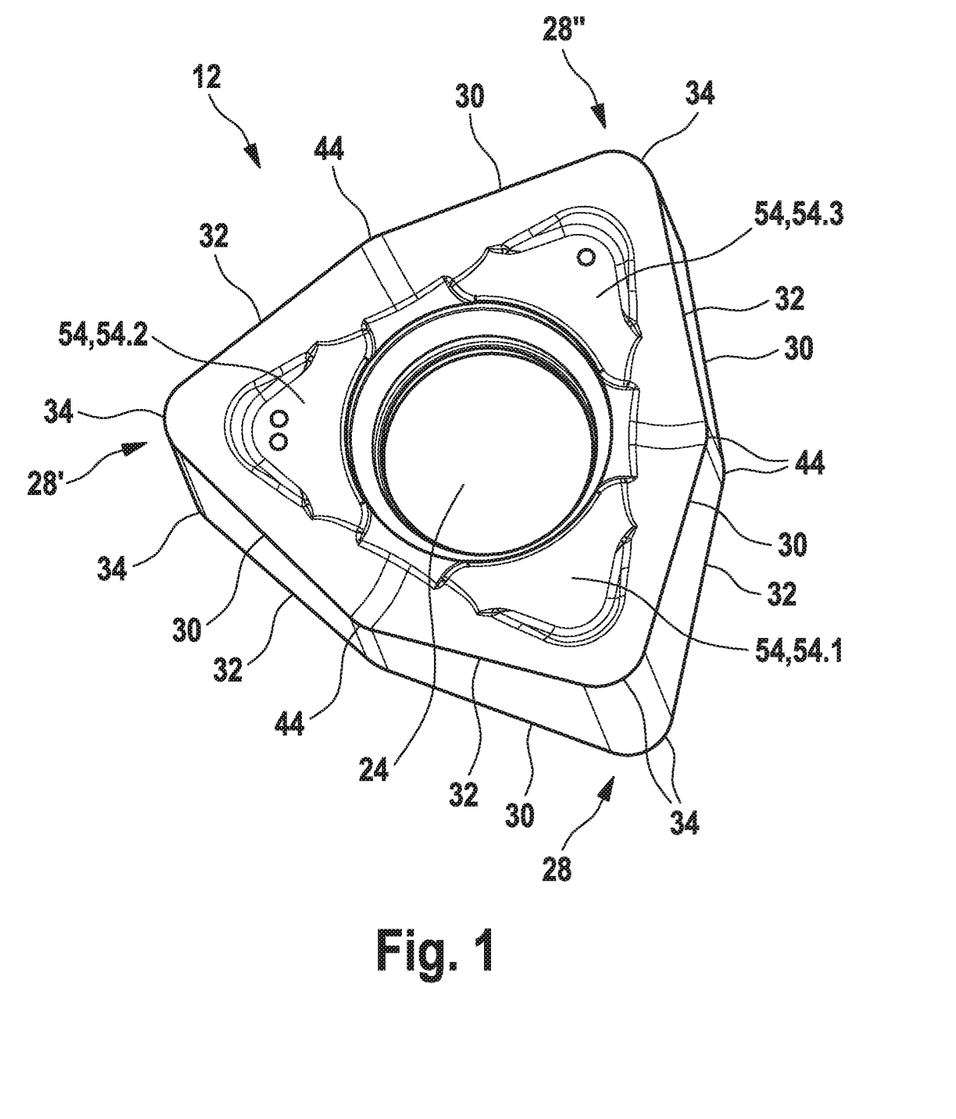
FIG. 1 shows a perspective view of an exemplary embodiment of the herein presented cutting insert.
Figure 2:
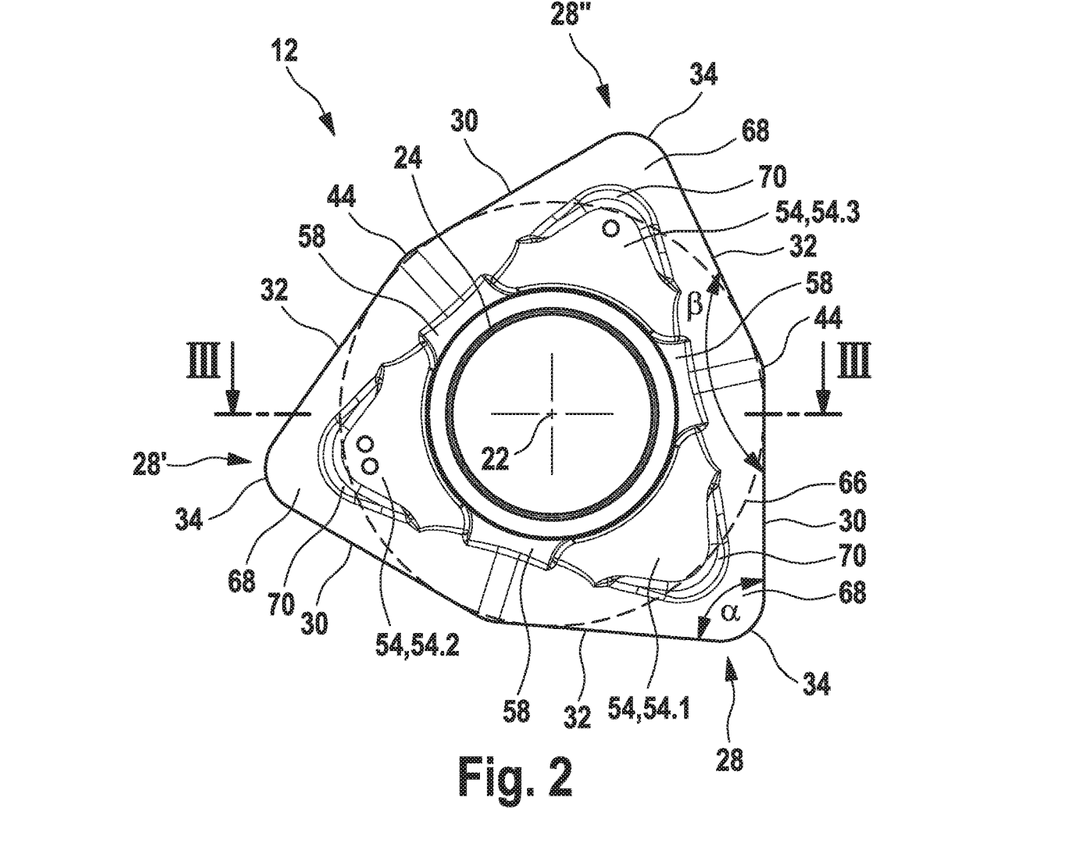
FIG. 2 shows a top view of the exemplary embodiment of the cutting insert shown in FIG. 1.

As can be seen in particular from FIG. 2, the cutting insert 12 is also 120° rotationally symmetrical with respect to the bore axis 22 in addition to the mentioned mirror symmetry. Each cutting insert 12 is therefore projected onto itself again with a rotation of 120° about the bore axis 22.

A circumferential surface 26, which surrounds the cutting insert 12 completely on the circumferential side, extends between the first side 16 and the second side 18 of the cutting insert 12. Three identically formed cutting regions 28, 28', 28" are situated at the transition between said circumferential surface 26 and the first side 16 and at the transition between the circumferential surface 26 and the second side 18, respectively.

In total, the cutting insert 12 consequently therefore has six identical cutting regions 28, 28', 28". Each of said cutting regions 28, 28', 28" comprises two rectilinear cutting edges 30, 32 as well as one arcuate cutting edge 34 which extends between said two cutting edges 30, 32. The first and second cutting edges 30, 32 are non-curved, non-angled, continuous cutting edges which extend along a straight line. The first and second cutting edges 30, 32 preferably have an identical form and length. The third cutting edges 34 are curved, preferably also continuous cutting edges. The third cutting edges 34 directly adjoin the first cutting edges 30 and the second cutting edges 32. More precisely, a first end 36 of the third cutting edge 34 of the first cutting region 28 is connected to a first end 38 of the first cutting edge 30 of the first cutting region 28 (see FIGS. 1, 2 and 4). A second end 40 of the third cutting edge 34 of the first cutting region 28 is connected to a first end 42 of the second cutting edge 32 of the first cutting region 28. The same applies correspondingly to the two other cutting regions 28', 28" of the same cutting insert side 16 or also to the three other cutting regions which are arranged in an identical manner on the second cutting insert side 18.

The first and second cutting edges 30, 32 of the respective cutting region 28, 28', 28" each enclose between on another an acute angle α which is preferably chosen within the range of between 84° and 86°. According to an embodiment, the size of the angle α is 85°.

A first cutting edge 30 of a cutting region 28, 28', 28" encloses in each case an obtuse angle β with a second cutting edge 32 of another, adjacent cutting region 28, 28', 28".

Each cutting insert 12 comprises, at the transition between the circumferential surface 26 and the first side 16 or at the transition between the circumferential surface 26 and the second side 18, additionally per side 16, 18, three arcuate edges 44 which are preferably designed as radii. Similarly to the arcuate cutting edges 34, said radii 44 are also arranged in each case between a first cutting edge 30 and a second cutting edge 32. Each first end 46 of the radii 44 adjoins a second end 48 of one of the first cutting edges 30. Each second end 50 of the radii 44 adjoins a second end 52 of one of the second cutting edges 32 (see FIGS. 5A and 5B). In contrast to the third, arcuate cutting edges 34, the radii 44 are, however, arranged between the three cutting regions 28, 28', 28" of each cutting insert side 16, 18 (see FIGS. 1 and 2). They therefore adjoin a second end 48 of the cutting edge 30 of a cutting region 28, 28' or 28" as well as a second end 52 of the second cutting edge 32 of another cutting region 28, 28', 28".

The cutting insert 12 additionally comprises on the first side 16 a first contact surface 54 which is divided into three part surfaces 54.1, 54,2, 54.3. The first contact surface 54 or the three first part surfaces 54.1, 54.2, 54.3 all lie in a plane which is designated in the present case as a first contact plane 56 (see FIG. 5A). Said first contact plane 56 extends orthogonally to the bore axis 22. The three first part surfaces 54.1, 54.2, 54.3 are separated from one another by three first indentations 58. Said first indentations extend, with reference to the bore axis 22, substantially radially outward. They are offset to one another by 120°. The first contact surface 54, as is explained in more detail further below, serves to abut against the tool holder 14. As a result of dividing the first contact surface 54 into three part surfaces 54.1, 54.2, 54.3, a defined three-point or three-surface support is created which contributes to the indexable cutting insert having a sturdy seat in the insert seat.

On account of the already named mirror symmetry to the center plane 20, the cutting insert 12 comprises on its second side 18 an equivalent contact surface 60 which is designated in the present case as a second contact surface 60 and is also divided into three second part surfaces. The second contact surface 60 or the three part surfaces of the second contact surface 60 also lie in a common plane which is designated in the present case as a second contact plane 62 (see FIG. 5B). Said second contact plane 62 extends parallel to the first contact plane 56 and perpendicularly to the bore axis 22.

Figure 5A:
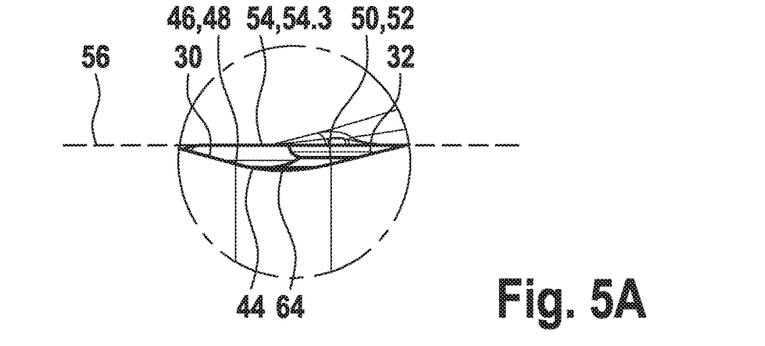
FIG. 5A shows a detail from FIG. 4.
Figure 5B:
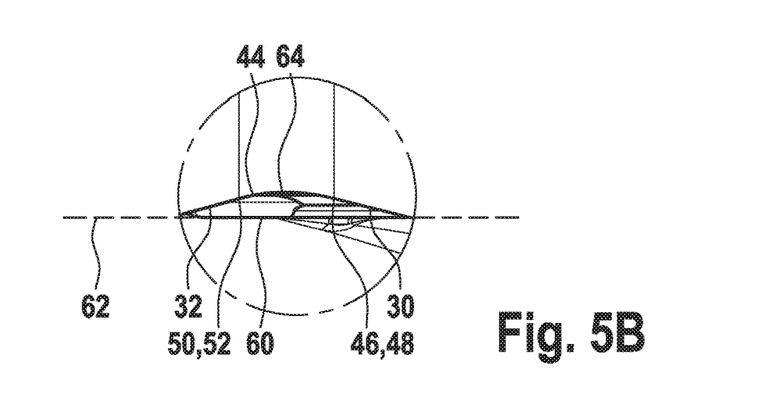
FIG. 5B shows a further detail from FIG. 4.

From the views of details shown in FIGS. 5A and 5B, it is additionally evident that the arcuate edges 44 each comprise a vertex 64, which vertices lie below the named contact planes 56 or 62. More precisely, the vertices 64 of the arcuate edges 44 arranged on the first side 16 lie below the first contact plane 56 and the vertices 64 of the arcuate edges 44 arranged on the second side 18 lie below the second contact plane 62. The total of six vertices 64 of the total of six arcuate edges 44 all lie therefore spatially between the first contact plane 56 and the second contact plane 62. The vertices 64 are therefore at a shorter distance from the center plane 20 than the contact planes 56, 58.

Figure 3:
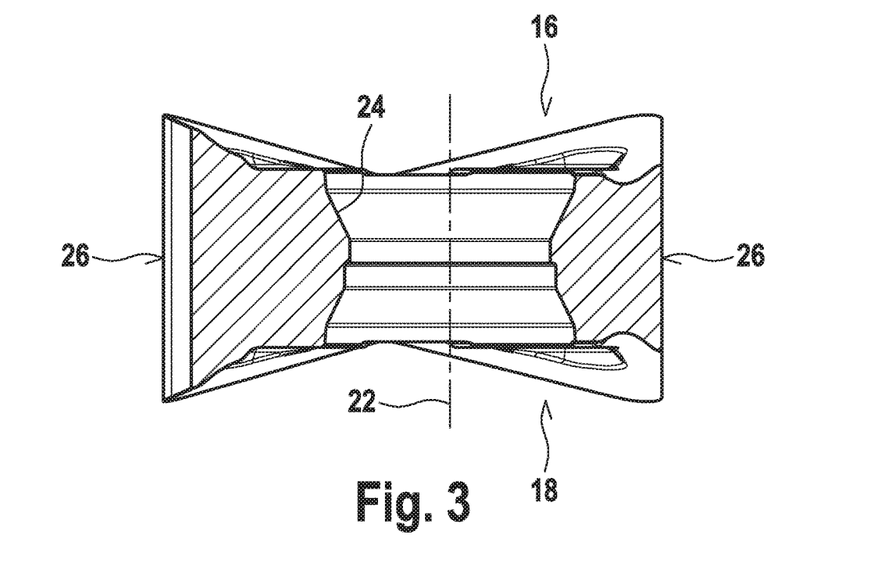
FIG. 3 shows a sectional view of the exemplary embodiment of the cutting insert shown in FIG. 1.
Figure 4:
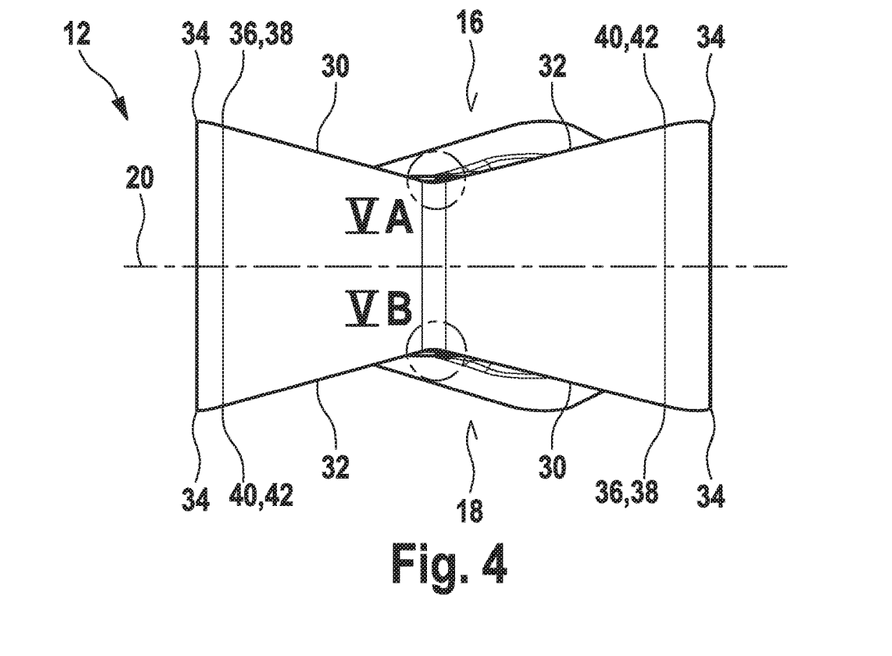
FIG. 4 shows a side view of the exemplary embodiment of the cutting insert shown in FIG. 1.

The following further features of the cutting insert 12 can be seen, in particular, in FIGS. 2-4: An imaginary circle 66, the center of which lies on the bore axis 22, touches the first and second cutting edges 30, 32 of the first side 16 at a total of six places, each cutting edge 30, 32 only being touched in each case by the imaginary circle 66 at one place. As can be seen in particular from FIG. 4, the cutting edges 30, 32 do not lie, however, in a common plane but extend transversely (that is to say not parallel) to one another. They all also extend transversely to the center plane 20 or to the contact planes 56, 58. The highest places of the cutting insert 12 or the places of the cutting insert 12 which are at the greatest distance to the center plane 20 compared to all remaining points of the cutting insert 12, are located at the vertices of the arcuate third cutting edges 34. Each of the first and second cutting edges 30, 32, accordingly proceeding from their respective first end 38, 42, extend at an angle toward the center plane 20 in the direction of their respective second end 48, 52. Each of the second ends 48 of the first cutting edges 30 and of the second ends 52 of the second cutting edges 32 are therefore at a shorter distance from the center plane 20 than the first ends 38 of the first cutting edges 30 and the first ends 42 of the second cutting edges 32.

As can additionally be seen from FIG. 2, each cutting region 28, 28', 28" comprises a curved cutting surface 68. Each of said cutting surfaces 68 extend in each cutting region 28, 28', 28" between the part contact surface 54.1, 54.2, 54.3 of the respective cutting region 28, 28', 28" and the respective cutting edges 30, 32, 34. A transition surface 70 extends in each case at the transition between the cutting surfaces 68 and the part contact surfaces 54,1, 54.2 and 54.3. Both the cutting surfaces 68 and the transition surfaces 70 lie "below" the vertices of the third cutting edges 34. The cutting surfaces 68 or the transition surfaces 70 are therefore at a smaller distance from the center plane 20 than the vertices of the third cutting edges 34. It is obvious that the same also applies to the second side 18 of the cutting insert 12.

Figure 6:
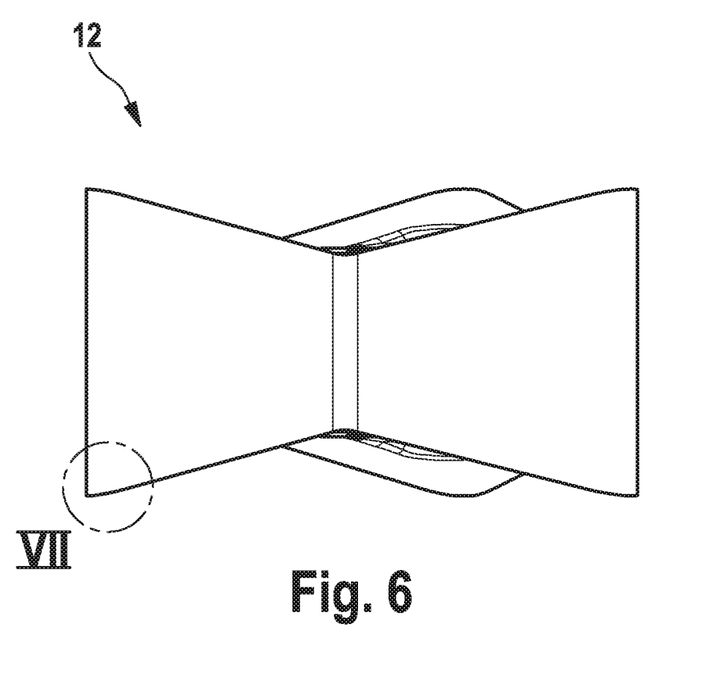
FIG. 6 shows a side view of a further exemplary embodiment of the cutting insert.
Figure 7:
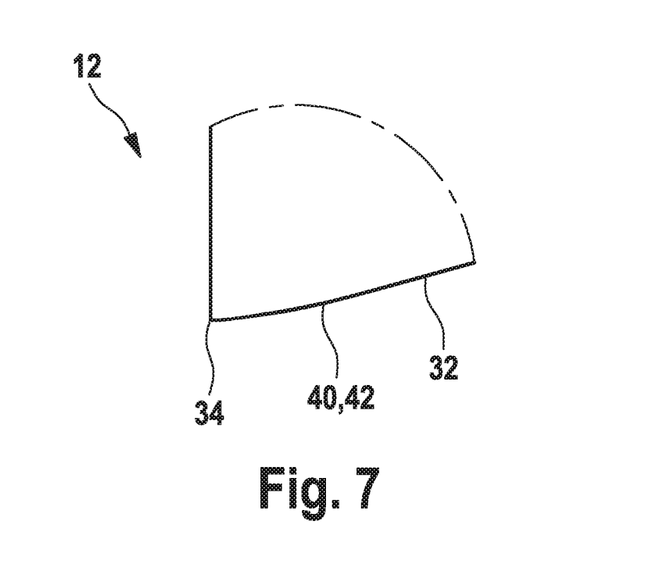
FIG. 7 shows a detail from FIG. 6.

FIGS. 6 and 7 show a second exemplary embodiment of the cutting insert 12. Said second exemplary embodiment corresponds substantially to the first exemplary embodiment shown in FIGS. 1-5. The radius of curvature of the third arcuate cutting edge 34 is simply a little smaller. So that there is no discontinuity at the respective transitions between the third cutting edges 34 and the first cutting edges 30 or the second cutting edges 32, the third cutting edge 34 according to said exemplary embodiment is curved in particular in the region of its ends 36, 40 about an axis which extends perpendicularly to the bore axis 22. The third cutting edges 34 are therefore not only curved about an axis which extends parallel to the bore axis 22 but also orthogonally thereto. This enables a constant transition from the third cutting edges 34 to the first or second cutting edges 30, 32.

FIGS. 8 and 9 show the tool holder 14 of the milling tool 10 without any cutting insert 12. FIGS. 10-12 show the milling tool 10 plus holder 14 and cutting insert 12.

The tool holder 14 comprises a shank 72, by way of which the tool holder 14 may be clamped in a suitable clamping means in a power tool. In the region of its front end 74, the shank 72, in the present exemplary embodiment, comprises two cutting insert receiving means 76 which serve for receiving one cutting insert 12 each. However, it is obvious that the tool holder 14, in alternative exemplary embodiments, is also able to comprise more than two cutting insert receiving means 76.

Each of the cutting insert receiving means 76 comprises a thread 78 which is provided in a bore and extends along a thread axis 80 and in which a screw 82, which serves for fastening the cutting insert 12 to the tool holder 14, is able to engage. Each cutting insert receiving means 76 additionally comprises three holder contact surfaces 84, 86, 88. The first holder contact surface 84 extends orthogonally to the thread axis 80. The second and the third holder contact surfaces 86, 88 extend parallel to the thread axis 80, that is to say orthogonally to the first holder contact surface 84. The second holder contact surface 86 and the third holder contact surface 88 enclose an obtuse angle together.

The cutting insert 12, in the mounted state of the tool 10, abuts exclusively against the three aforementioned holder contact surfaces 84, 86, 88 on the tool holder 14. The cutting insert 12 abuts against the first holder contact surface 84 with the first contact surface 54 or the second contact surface 60. In addition, it abuts against the holder contact surface 86, 88 with its circumferential surface 26.

The thread axis 80 is intentionally somewhat offset compared to the arrangement of the bore axis 22 of the cutting insert 12. More precisely, a distance between the thread axis 80 and the second holder contact surface 86 is the same size as a distance between the thread axis 80 and the third holder contact surface 88 but is smaller than a distance between the bore axis 22 and the two regions of the circumferential surface 26 by way of which the cutting insert 12 abuts against the holder contact surfaces 86 or 88. A pull-down action, which presses the cutting insert 12 against the holder contact surfaces 86, 88, is generated as a result when the screw 82 is tightened.

What is claimed is:

1. A cutting insert for a milling tool, having a first side, a second side which is identical to the first side, a circumferential surface which extends between the first and the second sides, and a bore which extends along a bore axis,
    wherein the cutting insert is 120° rotationally symmetrical with respect to the bore axis and comprises six identical cutting regions,
    wherein three of said six cutting regions are arranged at a transition between the first side and the circumferential surface, and wherein another three of said six cutting regions are arranged at a transition between the second side and the circumferential surface,
    wherein each of the six cutting regions comprises a first rectilinear cutting edge, a second rectilinear cutting edge, and a third arcuate cutting edge, wherein in each of the six cutting regions a first end of the first rectilinear cutting edge is connected to a first end of the third arcuate cutting edge, and a first end of the second rectilinear cutting edge is connected to a second end of the third arcuate cutting edge, and wherein the first and the second rectilinear cutting edges are of same length,
    wherein the cutting insert further comprises on the first side a first contact surface which extends orthogonally to the bore axis and lies in a first contact plane, and on the second side comprises a second contact surface which extends orthogonally to the bore axis and lies in a second contact plane,
    wherein each of the first rectilinear cutting edges has a second end located opposite the first end of the respective first rectilinear cutting edge, wherein each of the second ends of the first rectilinear cutting edges is connected to one of six arcuate edges,
    wherein each of said six arcuate edges has a vertex which is located between the first and the second contact planes, and
    wherein an imaginary circle, a center of which lies on the bore axis, is tangent to each of the first and second rectilinear cutting edges arranged on the first side.

2. The cutting insert as claimed in claim 1, wherein each of the arcuate edges has a first edge end and an opposite second edge end, wherein each of the first edge ends is connected to one of the second ends of the first rectilinear cutting edges and each of the second edge ends is connected to a second end of one of the second rectilinear cutting edges.

3. The cutting insert as claimed in claim 1, wherein the first rectilinear cutting edges enclose an acute angle $\alpha$ with the second rectilinear cutting edges of the respective same cutting regions.

4. The cutting insert as claimed in claim 3, wherein $84°\leq\alpha\leq 86°$ applies to the acute angle $\alpha$.

5. The cutting insert as claimed in claim 4, wherein the acute angle $\alpha$ is 85°.

6. The cutting insert as claimed in claim 1, wherein the cutting insert, at least except for the bore, is mirror-symmetrical with respect to a center plane which extends orthogonally to the bore axis and is equidistant to the first and the second contact planes.

7. The cutting insert as claimed in claim 6, wherein each of the third arcuate cutting edges comprises a second vertex, wherein each of the second vertices has a largest distance to the center plane compared to all remaining parts of the cutting insert.

8. The cutting insert as claimed in claim 1, wherein the first contact surface comprises three first part surfaces which are separated from one another and lie in the first contact plane, and wherein the second contact surface comprises three second part surfaces which are separated from one another and lie in the second contact plane.

9. The cutting insert as claimed in claim 8, wherein the three first part surfaces are separated from one another by three first indentations, and wherein the three second part surfaces are separated from one another by three second indentations.

10. A milling tool having:
  a cutting insert having a first side, a second side which is identical to the first side, a circumferential surface which extends between the first and the second sides, and a bore which extends along a bore axis, wherein the cutting insert is 120° rotationally symmetrical with respect to the bore axis and comprises six identical cutting regions, wherein three of said six cutting regions are arranged at a transition between the first side and the circumferential surface, and wherein another three of said six cutting regions are arranged at a transition between the second side and the circumferential surface, wherein each of the six cutting regions comprises a first rectilinear cutting edge, a second rectilinear cutting edge, and a third arcuate cutting edge, wherein in each of the six cutting regions a first end of the first rectilinear cutting edge is connected to a first end of the third arcuate cutting edge, and a first end of the second rectilinear cutting edge is connected to a second end of the third arcuate cutting edge, and wherein the first and the second rectilinear cutting edges are of same length, wherein the cutting insert further comprises on the first side a first contact surface which extends orthogonally to the bore axis and lies in a first contact plane, and on the second side comprises a second contact surface which extends orthogonally to the bore axis and lies in a second contact plane, wherein each of the first rectilinear cutting edges has a second end located opposite the first end of the respective first rectilinear cutting edge, wherein each of the second ends of the first rectilinear cutting edges is connected to one of six arcuate edges, wherein each of said six arcuate edges has a vertex which is located between the first and the second contact planes, and wherein an imaginary circle, a center of which lies on the bore axis, is tangent to each of the first and second rectilinear cutting edges arranged on the first side;
  a tool holder; and
  a fastening element for fastening the cutting insert to the tool holder.

11. The milling tool as claimed in claim 10, wherein the fastening element comprises a screw, and wherein the tool holder comprises a thread which extends along a thread axis, wherein said screw engages said thread, wherein the tool holder comprises a first, a second and a third holder-contact surface, wherein the first holder contact surface extends orthogonally to the thread axis, and the second and third holder contact surfaces extend transversely to one another and substantially parallel to the thread axis, and wherein the cutting insert, in a mounted state of the tool, abuts against the tool holder only at the first, the second and the third holder contact surfaces.

12. The milling tool as claimed in claim 11, wherein the second and the third holder contact surfaces enclose an obtuse angle between one another and the cutting insert abuts against the second holder contact surface with a first region of the circumferential surface and abuts against the third holder contact surface with a second region of the circumferential surface.

* * * * *

UNITED STATES PATENT AND TRADEMARK OFFICE
CERTIFICATE OF CORRECTION

PATENT NO. : 10,744,576 B2  
APPLICATION NO. : 16/196054  
DATED : August 18, 2020  
INVENTOR(S) : Christian Stark Page 1 of 1

It is certified that error appears in the above-identified patent and that said Letters Patent is hereby corrected as shown below:

On the Title Page

Item (73) "Assignee", Column 1, Lines 8-9, please delete "Hartmetall-Werkzeugfabrik Paul Hom GmbH, Tubingen (DE)" and insert -- Hartmetall-Werkzeugfabrik Paul Horn GmbH, Tübingen (DE) --, therefore.

Signed and Sealed this  
Fifteenth Day of December, 2020

Andrei Iancu  
*Director of the United States Patent and Trademark Office*